(12) United States Patent
Lacaze

(10) Patent No.: US 6,844,639 B2  
(45) Date of Patent: Jan. 18, 2005

(54) HIGH CURRENT ROTATING EXCITER

(75) Inventor: Alain Lacaze, Essert (FR)

(73) Assignee: ALSTOM Technology LTD, Baden (CH)

( * ) Notice: Subject to any disclaimer, the term of this patent is extended or adjusted under 35 U.S.C. 154(b) by 0 days.

(21) Appl. No.: 10/768,127

(22) Filed: Feb. 2, 2004

(65) Prior Publication Data

US 2004/0155541 A1 Aug. 12, 2004

(30) Foreign Application Priority Data

Feb. 1, 2003 (DE) .......................... 103 04 039

(51) Int. Cl.$^7$ .............................................. H02K 11/00
(52) U.S. Cl. ...................... 310/68 R; 310/211; 310/219
(58) Field of Search .............................. 310/68 R, 113, 310/114, 123, 219, 216, 261

(56) References Cited

U.S. PATENT DOCUMENTS

| | | | |
|---|---|---|---|
| 2,966,623 A | | 12/1960 | Mishkin |
| 3,733,505 A | | 5/1973 | Kildishev et al. |
| 4,056,882 A | | 11/1977 | Letts ........................... 29/597 |
| 5,130,596 A | * | 7/1992 | Umeki ........................ 310/234 |
| 5,508,577 A | * | 4/1996 | Shiga et al. ................. 310/201 |
| 6,018,209 A | | 1/2000 | Katoh et al. ................. 310/270 |
| 6,380,655 B1 | * | 4/2002 | Ide et al. ..................... 310/211 |
| 2001/0054855 A1 | | 12/2001 | Echtler et al. |
| 2002/0053852 A1 | | 5/2002 | Söderberg |

FOREIGN PATENT DOCUMENTS

| | | |
|---|---|---|
| DE | 1150750 | 6/1963 |
| DE | 3740178 A1 | 6/1989 |
| DE | 100 15 924 A | 10/2001 |
| DE | 101 19 830 A | 3/2002 |
| EP | 0 254 129 A | 1/1988 |
| GB | 982118 | 2/1965 |
| SU | 468 337 A | 4/1975 |

OTHER PUBLICATIONS

Search Report in DE 103 04 039.0 (Jan. 27, 2004).
Search Report in EP 04100218.9 (Jun. 16, 2004).

* cited by examiner

Primary Examiner—Thanh Lam
(74) Attorney, Agent, or Firm—Cermak & Kenealy LLP; Adam J. Cermak

(57) ABSTRACT

A very simple and reliable rotor (4) for a (brushless) exciter to be used to energise the field winding of a rotor of a generator, is proposed which can be used for high-speed rotation and for the generation of high currents for energising the field winding of the rotor of the generator. The rotor (4) comprises at least two conducting bars (6) aligned substantially parallel to the axis (8) of the rotor (4), wherein the bars (6) are connected on their first axial end to a collecting ring (13) and wherein on their second axial end the bars (6) are connected individually to two rings (14, 15) by means of diodes (16) with reversed polarity such that alternating current induced in the conducting bars (6) due to a static field (7) is converted into a direct current (DC) in the two rings (14, 15).

29 Claims, 5 Drawing Sheets a)

HIGH CURRENT ROTATING EXCITER

FIELD OF THE INVENTION

The present invention is related to a rotor for an exciter to be used to energise the field winding of a rotor of a generator. It more particularly relates to a rotor for a brushless exciter and it additionally relates to a brushless exciter comprising such rotor as well as to a mode of operation of such a brushless exciter.

BACKGROUND OF THE INVENTION

A synchronous machine is a dynamoelectric machine which may be utilised as a motor for driving a shaft or any load at a constant speed or as a generator for producing a voltage at a predetermined frequency depending on the speed of the driving shaft. When the device is used as a synchronous generator, it is customary to e.g. provide field excitation for the rotor through a synchronous brushless exciter generator. The exciter generator converts the direct current (DC) stator field into a polyphase alternating current (AC) armature voltage which is rectified by a set of rotating rectifiers mounted on or within the driving shaft to provide the DC excitation for the field windings of the synchronous generator, i.e. for the rotor of the generator.

Thus, a rotating exciter is a reversed generator with the field winding, fed with DC current, implemented on the static parts. The armature is located on the rotating part and produces AC voltage. A set of diodes is used to rectify it to produce a DC current, required to energise the field winding of the synchronous machine, i.e. the rotor.

As an order of magnitude, the power generated by the exciter is 0.5 to 2% of the rated power of the synchronous machine. Because the rotating exciter is a generator, this power could as well be made available with low, medium or high voltage. The voltage/current balance is chosen to best fit the available diodes characteristics. In principle the limitation in output current, due to the available diodes, can be overcome by setting two or more diodes in parallel. Actually this would result in a strong overload on diodes, and therefore the need for a heavy down-rating of them.

Nowadays, usually rotors operate at speeds of 3000 rotations per minute, leading to currents in the range of 2000 Ampere for energising the field winding of the synchronous machine. Usually the synchronous machine cannot be operated at higher rotational speeds due to a number of limitations such as instability of the shaft as well as high centrifugal forces on the rotating parts. In power generation, at a specified output, an increase of the rotary speed of a turbine however is associated with a decrease in size and costs. Efficiency, too, can be improved. Already, power generation turbines up to 70 MW are therefore connected to generators by way of gearing arrangements, so as to allow operation at higher rotary speeds. Consequently, there is a need for rotors for exciters which can be operated at high rotational speeds, which usually means lightweight construction, smaller diameter as well as longer dimension in axial direction and at the same time stability with respect to centrifugal forces.

SUMMARY OF THE INVENTION

It is therefore the aim of the present invention to propose a new rotor topology for an exciter to be used to energise the field winding of a rotor of a generator, which can be operated at high rotational speeds, which allows more flexibility in current/voltage ratio allowing in particular the production of high current at low frequency in the rotor, which is compact, low-cost, and strong from a mechanical point of view.

This aim is achieved by a rotor as defined in the characterising portion of claim 1 as well as by a brushless exciter according to claim 10. The proposed rotor according to the present invention is characterised in that it comprises at least two conducting bars aligned substantially parallel to the axis of the rotor, that the bars are connected on their first axial end to a collecting ring and that on their second axial end the bars are connected individually to two rings by means of diodes with reversed polarity such that alternating current induced in the conducting bars due to a static field is converted into a direct current in the two rings.

This very simple and sturdy construction with basically three rings collecting currents and at least two bars parallel to the axis of the rotor between these rings permits high currents as bigger conductors with less turns and welded parts are necessary, and is particularly suited for brushless excitation. In particular the very simple design of the end windings in the form of rings significantly simplifies construction making it smaller and sturdier, i.e. allowing very high peripheral speeds and increasing the B-field usage. The bar technology which can be used for the connections between the two rings allows low-cost manufacturing. The second advantage is to have a low voltage rotor, thus making rotor insulation simpler and cheaper. The proposed rotor for the exciter is inherently lighter than usual exciters, with the possibility of implementing it anywhere on the shaft. It is a usual practice to locate the exciter in-line with the shaft. This makes problems with the critical speeds and with the overhung weight (leverage effect). When the shaft is to be coupled on both sides, it is no longer possible to locate the exciter on the shaft end. Another type of exciter has then to be used, which is even heavier and has more impact on the shaft inertia. The presented rotor allows to integrate the exciter completely into the shaft which is of particular interest for double turbine arrangements, i.e. where the generator is located between two gas turbines, or when critical speed problems become serious.

According to a first preferred embodiment of the present invention, the collecting ring is circumferential, and preferentially also the two rings are circumferential. The use of closed rings is very simple and cheap, and at the same time it is a construction with very high stability with respect to centrifugal load.

According to another preferred embodiment, the bars are arranged close to the radial surface of the rotor, preferably as close as possible to the air gap between the rotor and the static outer core. This arrangement allows the maximum induction in the bars leading to the highest possible efficiency with respect to the generation of DC current.

According to still another preferred embodiment at least 4 conducting bars, preferably at least 8 conducting bars, and even more preferably 16 conducting bars are present, all of which are evenly distributed along the circumference of the rotor. Also larger numbers of parallel bars are possible, like for example up to 100 bars. Basically this design is topologically identical to a so-called "squirrel cage" rotor as it is commonly used for electrical motors. The design proves to be very well suited for the purposes of a brushless exciter, too, as this topology allows high currents and inherently, due to its symmetry, shows a well-balanced behaviour of the currents between the different parallel paths along the bars. In fact, the equivalence of all the bars substantially avoids eddy-currents which usually have to be accounted for by particular designs of the conductors. This inherent balance between the bars, i.e. the conducting paths, allows the use of basically any grade of diodes, and individual diodes do not have to be rated for high current or for high voltage or to be fast ones thanks to the fact that there is no peaks or ripples on the induced currents anymore.

According to another preferred embodiment, the bars are made of aluminium or copper, with preferentially a substantially circular cross-section of a diameter in a range of 5 to 20 mm, preferably with a diameter in a range of 10 to 15 mm. The simple and cheap construction in bar technology is possible and there is no need for sophisticated multiple layer/multiple conductor designs of the connections between the rings. Usually, also the rings are made of aluminium or copper with a cross-section area in the range of 500 to 3000 mm$^2$, preferably with a cross-section area in the range of 1000 to 2000 mm$^2$.

Preferably, such a rotor can be operated at speeds of 6000 to 8000 rotations per minute thereby inducing a direct current in the two DC rings of more than 2000 Ampere, preferably inducing a direct current of more than 10000 Ampere. This very high rotational speed at high currents is possible due to the compact and sturdy construction of the rotor. The static field for inducing currents in the bars is provided by a field winding on the static outer core giving rise to a bipolar static magnetic field, but may also be provided by a permanent magnet located on the static outer core. Also multiple pole static fields are possible. In case of a permanent magnet, its field may be increased or attenuated to allow the control of the DC current generated by the exciter by a corresponding field winding, the field of which either adds or subtracts from the static field due to the permanent magnet (field winding for offset).

Further preferred embodiments are described in the dependent claims.

Additionally, the present invention relates to a brushless exciter for use with a synchronous generator for energising the field winding of its rotor, making use of a rotor as it is described above. Preferably, such a brushless exciter induces a bipolar static field by at least one field winding fed with a direct current of in the range of 1 to 100 Ampere, preferably in the range of 5 to 15 Ampere, or the bipolar static field is induced by a permanent magnet whereby the control of the bipolar static field is then achieved by a field winding, either attenuating or adding to the background field provided by the permanent magnet.

Ideally, a permanent magnet or a static field winding provided on the static outer core provides a magnetic field which is homogeneously rectangular, i.e. where the field strength is constant as a function of the rotational angle changing sign according to a Heavyside function at the angular positions where the polarity changes. However, as is well-known, as soon as the rotor starts to rotate, there is an armature reaction giving rise to a static reaction field superposed to the static field present due to the static field winding. This additional reaction field or armature reaction distorts the field visible to the bars inducing inhomogeneous behaviour between the different bars and leading to ripples/peaks of the induced currents. It may therefore be advantageous or sometimes even necessary to provide, according to another preferred embodiment, means for cancellation of the armature reaction of the rotating rotor.

According to a preferred embodiment of such means to cancel the armature reaction, the cancellation is achieved by a set of auxiliary windings located on the static outer core, whereby preferably the geometry of such auxiliary windings is the same as the one of the rotor. Adapting the symmetry of the means to cancel the armature reaction to the symmetry of the rotor provides a very simple and at the same time very efficient possibility to cancel this armature reaction. Almost full restoration of the ideal homogeneous field as induced by the static field winding when the rotor is not rotating is possible when using the symmetrical topology. Again, this can be achieved by using simple bar technology allowing a cheap and easy manufacturing of this cancellation means for the armature reaction.

According to another preferred embodiment of the means to cancel the armature reaction, the auxiliary windings for cancellation are substantially located on the inner surface of the static outer core whereby in the region of the rotor these windings are arranged substantially parallel to the axis of the rotor. Preferably, the same number of individual conductors of the windings are provided as there are bars on the rotor, thus providing, as mentioned above, the same symmetry as on the rotor, in particular if these individual conductors of the windings are evenly distributed circumferentially around the air gap and also the bars of the rotor are evenly distributed along the circumference of the rotor. Simple and easily controllable cancellation of the armature reaction is possible if the individual conductors of the windings are substantially equally fed with a direct current of opposite direction to the one induced in the bars of the rotor when it is rotating.

As in particular during the time of transients, i.e. if the inducing field is reduced or increased, the current flowing in individual bars of the rotor cannot be theoretically predicted or derived from the resulting DC current or the inducing static field, it is necessary, to avoid overload on the diodes due to ripples and the like, to provide means to adapt the cancellation current to the currents actually flowing in the bars of the rotor. Therefore, according to another preferred embodiment, sensing means are provided to allow such control. Correspondingly, a sensor is provided to measure the armature reaction and to correspondingly control the means for cancelling said armature reaction.

There is a number of sensors for magnetic fields, like for example a Hall-sensor, which are only sensitive to the component of a magnetic field in one spatial direction but not sensitive to components orthogonal to this preferred direction.

Such a sensor is particularly well-suited in the present context if it is located at a position, where the static magnetic field produced by the field winding is substantially perpendicular to the sensitive direction of the sensor. The use of such sensor positioned accordingly in this particular region, where the component of the desired static magnetic field is orthogonal to the sensitive direction of the sensor allows accurate and basically offset-free measurement of the armature reaction. One such position where a sensor may be positioned is next to the field winding in or close to the air gap, with the sensitive axis of the sensor oriented perpendicularly (e.g. radially outwards with respect to the axis of the rotor) to the axis of the magnetic field induced by the static field winding.

Further preferred embodiments of the proposed brushless exciter are given in the depending claims.

Furthermore, the present invention relates to a method for operating a brushless exciter as described above, which is characterised in that during the time of transients when the static magnetic field is either reduced or increased, sensing means measuring the armature reaction are being used to control the current fed through the auxiliary windings.

Further preferred embodiments of the method are given in the depending claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2a) shows a schematic cut perpendicular to the axis of the exciter through the rotor according to the invention; b) schematically shows the electrical connectivity of the rotor;

DESCRIPTION OF THE PREFERRED EMBODIMENTS

Figure 1:
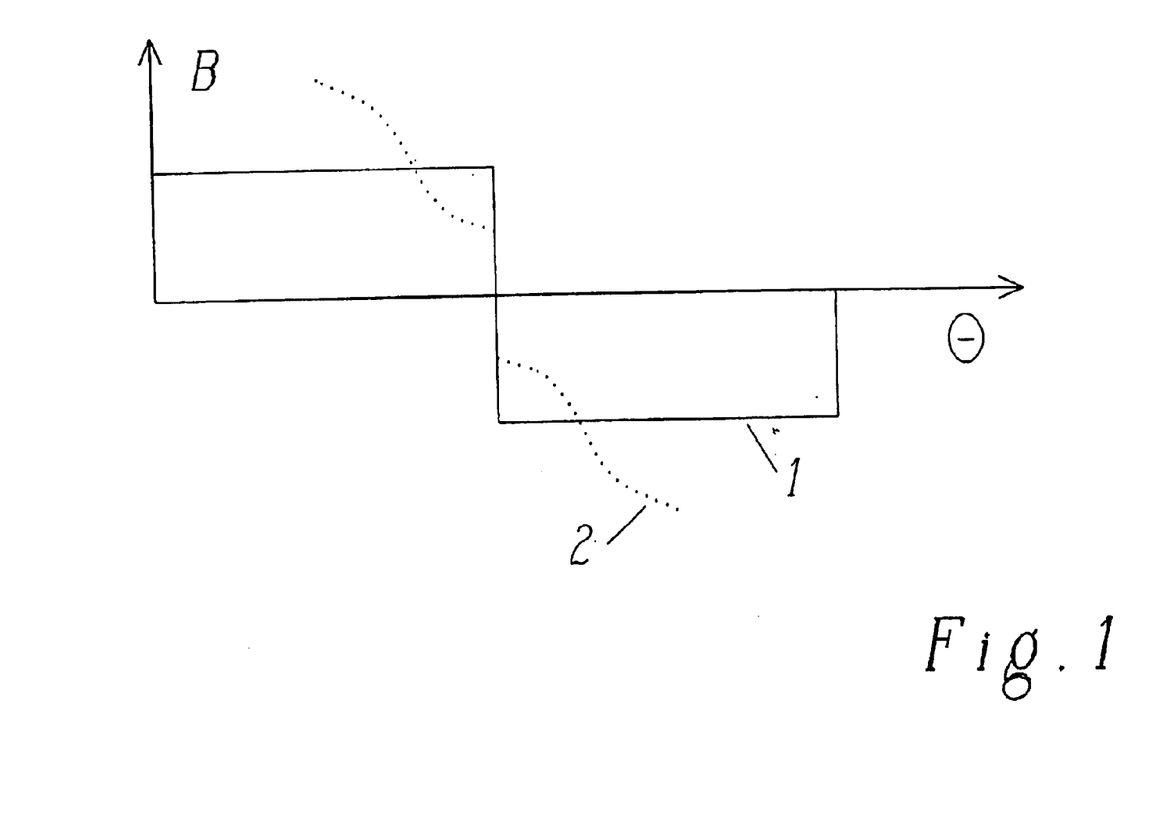
FIG. 1 shows a schematic representation of the static magnetic field (B) as a function of the circumferential angle Theta.
Figure 2:
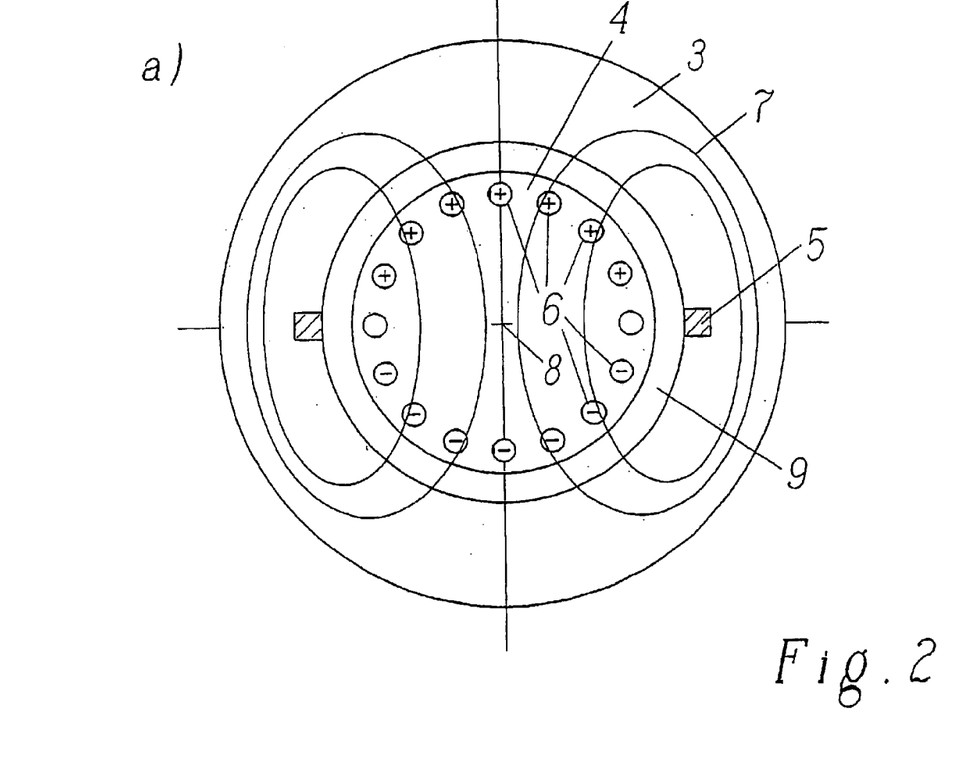

FIG. 2a) shows an axial cut through an exciter serving as a preferred embodiment. The rotor 4 is coaxially mounted in an static outer magnetic core 3, wherein in between there is an air gap 9. The static outer core 3 comprises a field winding 5 which induces a magnetic field as indicated with the lines 7. In this embodiment the induced magnetic field 7 is bipolar, i.e. the field winding 5 is fed with a current positive on the right side and negative on the left side or vice versa in FIG. 2a). It is however also possible to have a permanent magnet giving rise to such a bipolar field. The use of a permanent magnet does not allow to directly control the current induced in the rotor, which is necessary to control the output power of the generator, and therefore usually if permanent magnets are used, there is also a field winding 5, which can be used either to increase or to decrease the static background magnetic field by feeding it with an appropriate current. The magnetic field 1 induced by the field winding 5 is schematically drawn in FIG. 1 as a function of the angle theta around the rotational axis 8 common to the rotor 4 and the static outer core 3. The ideal magnetic field 1 shows a rectangular characteristic, the sign change being located at the position where theta aims at the field winding 5, i.e. horizontally in FIG. 2a).

As can be seen from FIG. 2a), basically the rotating part, i.e. the rotor 4, looks very much like the one of an induction machine with a squirrel cage rotor. On a one side all the conductors which in this case are given by bars 6 are welded or electrically connected to a ring 13 (see FIG. 2b)) which collects the current and dispatches it to the return bars 6. On the other side, each bar 6 is electrically connected individually to two rings 14 and 15 by means of diodes 16 with reversed polarity. These two rings are the DC terminals. All the bars 6 are identical and are evenly distributed around the circumference of the rotor 4. The crossed diodes 16 lead to a rectification of the alternating current induced in the bars 6 when the rotor is rotating in the static magnetic field 7, thus giving rise to a direct current (DC) in the two rings 14 and 15, which current 17 can subsequently be used for energising the rotor of the generator.

The bars 6 as well as the rings 13, 14, 15 are made of copper or aluminium. For a diameter of the rotor 4 of 600 mm, 50 bars are distributed along the circumference of the rotor 4, each of the bars 6 having a substantially circular cross-section with a diameter of 10 to 15 mm. Such a rotor is capable of rotating at speeds of 4000 to 8000 rotations per minute, and of producing direct currents in a range of 5000 to 20000 Ampere. The achievable rotational speeds are therefore at least twice as high as conventional speeds, and the achievable currents are even in the range of 20 to 30 times with respect to the state-of-the-art. The rings 13, 14, 15 are circumferential to withstand the centrifugal forces at these rotations. The bars 6 may be moulded into corresponding slots of the rotor 4, which slots preferably have shapes which allow a tight fixing of the bars with respect to centrifugal loads (e.g. dove tails). Another possibility is to provide axial holes in the rotor 4 and to insert bars 6 into these holes from the axial side.

With this arrangement one has a huge number of diodes in parallel. If one diode is overloaded it will break, resulting in a permanent short and therefore in a fatal fault. It is thus important that the current is perfectly balanced between all of the parallel paths.

The internal voltage V across a given diode is the sum of the threshold voltage, Vo, plus a term which is proportional to the current:

$$V = V_0 + r_i I$$

The internal-resistance is quite weak and any unbalance in the electromotive force would result in a large discrepancy in current through the parallel diodes.

In order to obtain substantially exactly the same electromotive force on each parallel bar of the squirrel cage, the air gap field should be as "rectangular" as possible, as given by curve 1 in FIG. 1, and as it is induced by the field winding 5 according to FIG. 2a).

When no current flows in the squirrel cage the field 7 well matches the required rectangular shape 1. The situation degrades as soon as a current flows in the "squirrel cage", i.e. in the bars 6, as indicated in FIG. 2a) by the plus and minus signs. When the DC current flowing in the bars 6 is low it will be distributed more or less according to the generated voltage.

Figure 3:
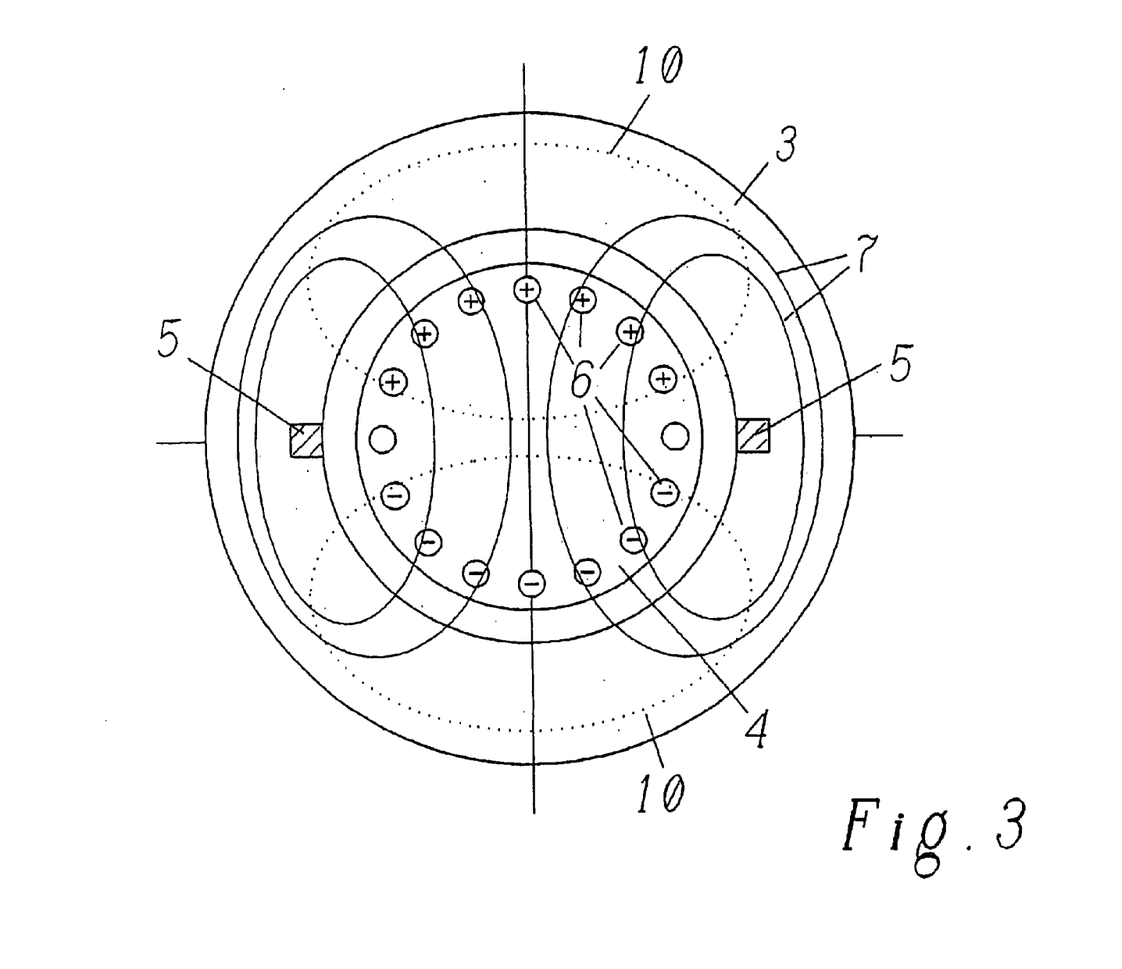
FIG. 3 shows a cut according to FIG. 2a), where the armature reaction during rotation of the rotor is indicated.

The resulting flux pattern is given in FIG. 3. It creates an armature reaction 10 with, as usual in synchronous machines, a 90 degree shift. This field is static, constant in size and direction, and will add-up to the main field 7 produced by the single turn field winding 5. The angular distribution of field 10 is more or less a sine wave, whereas the induction field 7 is rectangular and 90 degree out of angular phase. When the current in the bars 6 increases, the armature reaction 10 will increase, thus distorting the magnetic field. This qualitatively leads to a field characteristic as given by the dotted curve 2 in FIG. 1.

The generated voltage out of this distorted field 2 will no longer be of the required rectangular shape. This results in a distorted voltage pattern, giving rise to an additional (building-up with the former) field distortion. By the end of the process, the voltage distortion will result in an unacceptably high value of the repetitive peak current in the diodes, still with a withstandable mean value. Sooner or later one diode will fail, followed by a cascade of failures of the other diodes.

It may therefore be advantageous to provide means to cancel the armature reaction 10 in case of such a rotor 4. As given in FIG. 4, the idea is simply to add an auxiliary winding 11 on the static part 3, to compensate for the armature reaction 10. This field winding 11 should simply have the same geometry as the bars 6 of the rotor, i.e. the squirrel cage. Because an even distribution of current on the rotating part is desired, one has to cancel the armature reaction 10 with an even angular distribution of currents. The auxiliary winding 11 should simply be fed by a DC current of same amplitude in each slot. The simplest is to have all the auxiliary turns 11 in parallel, in such a way that the conductors 11 located on a one side of the main turn hold current in one direction and the conductors on the opposite side hold current in the opposite direction, a situation which is indicated in FIG. 4 by plus and minus signs, which are opposite to the signs in the rotor 4.

In particular during the time of transients, the current out of the exciter 17 does not follow exactly the generated voltage. Transients are for example given when the inducing field 7 is increased or decreased by changing the DC fed through the static winding 5 in order to change the direct current 17 to be fed to the rotor of the generator, thereby changing the power output of the generator. Additionally, due to saturation effects and turn localisation, the actual current which has to be fed to the auxiliary winding 11 cannot be assessed neither from the main coil current through the winding 5 nor from the output current 17. As the armature reaction 10 may depend on the actual duty of the exciter, and to enable tuning, the auxiliary winding current 11 may preferably be determined from a simple field measurement in the air gap 9, for instance at the mean angular position of the main winding 5, where the armature reaction is strongest and where the main field is theoretically zero, in particular in a direction orthogonal to the plane defined by the main winding 5.

Figure 4:
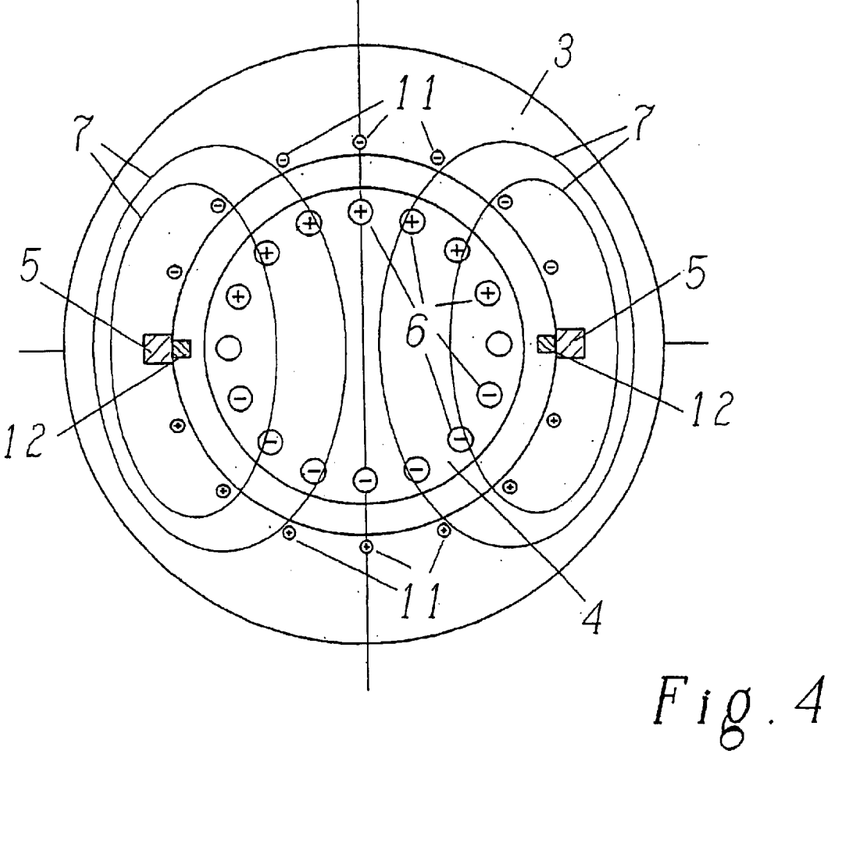
FIG. 4 shows a cut according to FIG. 2a), wherein additionally means for compensation of the armature reaction are located on the static outer core.

The field measurement can be carried out by a sensor 12, as indicated in FIG. 4. The sensor may e.g. be a Hall sensor, whereby the axis with respect to which the sensor is actually capable of measuring the magnetic field is oriented perpendicularly to the axis defined by the plane given by the static winding 5 and therefore perpendicularly to the main direction of the desired static main field 7 (i.e. horizontally in FIG. 4). For maximum sensitivity of the sensor 12 it is sensitive axis should be oriented parallel to the main component of the armature reaction 10.

The same configuration and balancing means can be applied in 4-pole or even higher pole number. The main benefits are:

Voltage/current ratio can be changed by connecting poles in series.

Reduced magnetic core cross section

Smaller cross section and length of the end-windings of the main winding, the auxiliary winding, and of the squirrel cage.

Better balance of magnetic forces.

However, there are some penalties when using more than one pair of pole like e.g.

Increased diode commutation frequency

Connection rings of the "squirrel cage" have to be split. The mechanical management to withstand the centrifugal force becomes more sophisticated, therefore more expensive.

As mentioned above, for the generation of the static field 7 also a permanent magnet can be used. The use of permanent magnet is quite easy, because it is on the static part 3 and the required field is "rectangular". The advantage of using permanent magnets to provide the background field (which is, if need be, attenuated or increased by a supplementary field winding, used to generate the offset on the background field provided by the permanent magnet) is, first, to lower the armature reaction 10, thus making its cancellation easier. The specific geometry of this exciter in this case allows to keep the main coil 5 and use it only to make an offset field. For instance the permanent magnet can provide the required field to produce the rated current of the rotor of the generator. The main coil 5 of the exciter will then be used only to increase or decrease the magnetic field by the quite small amount required to control the generator voltage. The load on the main coil will be high only during no-load and over-excited operation.

To summarise, one can foresee the following advantages of the new exciter topology:

compactness: due to simple end-windings robust winding: allows very high peripheral speed, thus increasing the B field usage (V=B.l.v: increasing speed allows to have shorter length or weaker magnetic field)

low cost manufacturing: similar to an induction machine, bar technology.

very short commutation time due to the low inductance of loops.

making the end of shaft free for any other purpose allowing to use any grade of diodes, individual diodes have no need to be rated for high current or for high voltage, or to be fast ones.

the exciter can be completely integrated to the shaft. This is of particular interest for double turbine arrangements where on both sides of the generator there is a turbine, or when critical speed problems become significant.

LIST OF REFERENCE NUMERALS 1 ideal air gap field
2 approximate air gap field with armature reaction
3 static outer magnetic core
4 rotor
5 field winding
6 bars of the squirrel cage rotor
7 field induced by the field winding
8 axis of the rotor
9 air gap
10 armature reaction
11 auxiliary winding
12 sensor
13 collecting ring
14 first direct current (DC) ring
15 second direct current (DC) ring
16 diodes
17 direct current to rotor of the generator

What is claimed is:

1. A rotor for an exciter to be used to energise the field winding of a rotor of a generator, the rotor comprising:
   a collecting ring, two rings, and diodes having reversed polarity; and
   at least two conducting bars aligned substantially parallel to the axis of the rotor, the at least two conductor bars being connected on a first axial end to the collecting ring and on a second axial end of each bar individually to the two rings by the diodes, such that alternating current induced in the conducting bars due to a static field is converted into a direct current (DC) in the two rings.

2. A rotor according to claim 1, wherein the collecting ring is circumferential.

3. A rotor according to claim 1, wherein the bars are arranged close to the radial surface of the rotor.

4. A rotor according to claim 1, wherein the at least two conducting bars comprises at least four conducting bars evenly distributed along the circumference of the rotor.

5. A rotor according to claim 1, wherein the bars are made of aluminium or copper, with a substantially circular cross-section of a diameter in a range of 5 to 20 mm.

6. A rotor according to claim 1, wherein the rings are made of aluminium or copper with a cross-section area in the range of 500 to 3000 mm$^2$.

7. A rotor according to claim 1, wherein the rotor is configured and arranged to be operated at speeds of 6000 to 8000 rotations per minute thereby inducing a direct current in the two rings of more than 2000 Ampere.

8. A rotor according to claim 1, further comprising:
a field winding on the static outer core giving rise to a bipolar static magnetic field.

9. A rotor according to claim 1, wherein the rotor is configured and arranged to be used for brushless excitation.

10. A brushless exciter for use with a synchronous generator for energising the field winding of a rotor of the generator, comprising a rotor according to claim 1.

11. A brushless exciter according to claim 10, further comprising:
at least one field winding configured and arranged to induce a bipolar static field, the at least one field winding being fed with a direct current in the range of 1 to 100 Ampere; or a permanent magnet configured and arranged to induce a bipolar static field, and a field winding configured and arranged to control the bipolar static field.

12. A brushless exciter according to claim 10, further comprising:
means for cancellation of an armature reaction of the rotating rotor.

13. A brushless exciter according to claim 12, further comprising:
a set of auxiliary windings configured and arranged for cancellation of the armature reaction, the set of auxiliary windings being located on the static outer core.

14. A brushless exciter according to claim 13, wherein the auxiliary windings are substantially located on the inner surface of the static outer core and that in the region of the rotor the auxiliary windings are arranged substantially parallel to the axis of the rotor.

15. A brushless exciter according to claim 14, wherein the number of individual conductors of the windings is the same as the number of bars on the rotor, and that said individual conductors of the windings are evenly distributed circumferentially around an air gap.

16. A brushless exciter according to claim 15, wherein the individual conductors of the windings are substantially equally fed with a direct current of opposite direction to the current induced in the bars of the rotor when the rotor is rotating, thereby cancelling the armature reaction.

17. A brushless exciter according to claim 12, further comprising:
at least one sensor configured and arranged to measure the armature reaction and to correspondingly control the means for cancelling said armature reaction.

18. A brushless exciter according to claim 17, wherein the sensor is only sensitive to components of a magnetic field in one spatial direction and not sensitive to components perpendicular to said one spatial direction, and wherein the sensor is located at a position where the static magnetic field induced by the field winding or by the permanent magnet is substantially perpendicular to said one spatial direction of the sensor.

19. A brushless exciter according to claim 18, wherein the sensor is located next to the field winding in or close to an air gap.

20. A method for operating a brushless exciter, the method comprising:
providing a brushless exciter according to claim 13; and
measuring with sensing means, during the time of transients when the static magnetic field is either reduced or increased, the armature reaction; and
controlling the current fed through the auxiliary windings based on said sensing.

21. A rotor according to claim 2, wherein the two rings are circumferential.

22. A rotor according to claim 3, wherein the bars are arranged close to the air gap between the rotor and the static outer core.

23. A rotor according to claim 4, wherein the at least four conducting bars comprises at least eight conducting bars.

24. A rotor according to claim 23, wherein the at least eight conducting bars comprises at least sixteen conducting bars.

25. A rotor according to claim 5, wherein the diameter is in a range of 10 to 15 mm.

26. A rotor according to claim 6, wherein the rings have a cross-section area in the range of 1000 to 2000 mm$^2$.

27. A rotor according to claim 7, wherein the rotor is configured and arranged to induce a direct current of more than 10000 Ampere.

28. A brushless exciter according to claim 11, wherein the at least one field winding is fed with a direct current in the range of 5 to 15 Ampere.

29. A brushless exciter according to claim 13, wherein the geometry of the auxiliary windings is the same as the geometry of the bars of the rotor.

* * * * *